United States Patent
Trangsrud et al.

(10) Patent No.: US 7,361,834 B1
(45) Date of Patent: Apr. 22, 2008

(54) ELECTRIC HANDHOLE/PULLBOX ACCESS COVER

(75) Inventors: Julian P. Trangsrud, Northfield, MN (US); David E. Erickson, Crosslake, MN (US)

(73) Assignee: JDT Concepts, LLC, Bemidji, MN (US)

( * ) Notice: Subject to any disclaimer, the term of this patent is extended or adjusted under 35 U.S.C. 154(b) by 0 days.

(21) Appl. No.: 11/672,128

(22) Filed: Feb. 7, 2007

(51) Int. Cl.
*H02G 3/14* (2006.01)

(52) U.S. Cl. .............................. 174/66; 174/67; 52/20; 52/21; 404/25

(58) Field of Classification Search .................. 174/50, 174/66, 67, 135, 58, 63, 17 R; 220/241, 220/242, 3.8, 4.02; 404/25, 26; 52/20, 21, 52/19; 361/600, 601; 439/535; 248/906
See application file for complete search history.

(56) References Cited

U.S. PATENT DOCUMENTS

| | | | |
|---|---|---|---|
| 3,920,347 A | 11/1975 | Sauriol et al. | |
| 4,662,777 A * | 5/1987 | Newton | 404/25 |
| 4,973,191 A | 11/1990 | Dannhauser | |
| 5,123,776 A * | 6/1992 | Lang et al. | 404/25 |
| 5,312,202 A | 5/1994 | Newton | |
| 5,362,174 A * | 11/1994 | Yang | 404/25 |
| 5,529,431 A | 6/1996 | Walsh | |
| 6,161,984 A | 12/2000 | Sinclair | |
| 6,393,771 B1 | 5/2002 | Stetson | |
| 6,655,093 B1 | 12/2003 | Gavin | |
| 6,688,807 B2 * | 2/2004 | Navarrete | 404/25 |
| 6,881,899 B1 * | 4/2005 | Trangsrud | 174/50 |
| 6,893,186 B1 | 5/2005 | Tello, Sr. | |
| 7,104,722 B2 | 9/2006 | LaCroix | |
| 7,163,352 B2 * | 1/2007 | Jurich et al. | 404/25 |
| 7,225,587 B2 * | 6/2007 | Shinehouse et al. | 52/19 |

\* cited by examiner

*Primary Examiner*—Angel R. Estrada
(74) *Attorney, Agent, or Firm*—Steven E. Kahm; Nikolai & Mersereau, P.A.

(57) ABSTRACT

A lightweight plastic cover for an electric handhole or pullbox having a plurality of vertical channels in a circular array at a radius about halfway from the center to the circumference. The channels allow the cover to bend when a large weight is applied and to rebound when the weight is removed. The cover may also have a second circle of vertical channels for strength nearer the center and horizontal channels crossing the center for added strength. The cover has a metal plate attached in the center for finding the cover with a metal detector and may also have a GPS device for locating it. The electric handhole or pullbox may have an open bottom portion with a ledge around the circumference for helping to set and maintain the electric handhole or pullbox at a desired depth. The cover may have extendable handles for ease of holding.

19 Claims, 3 Drawing Sheets

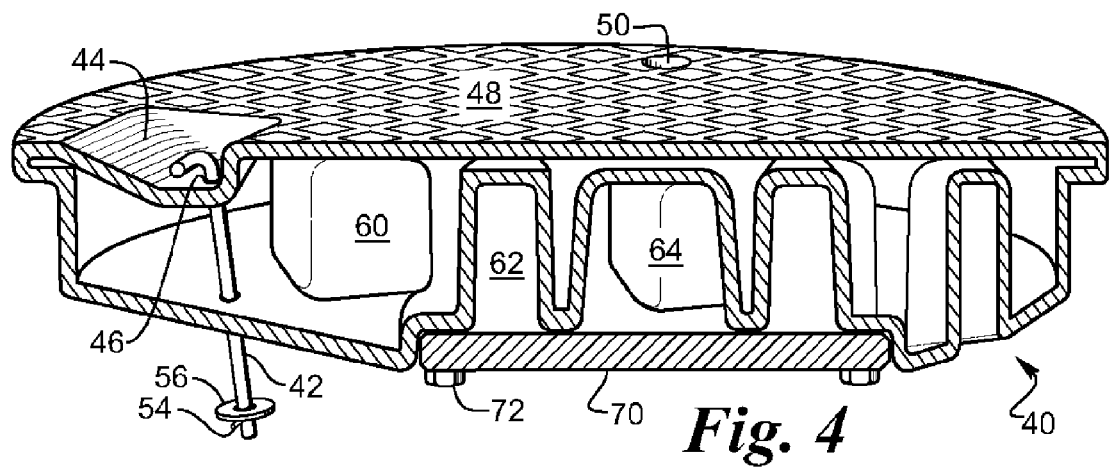
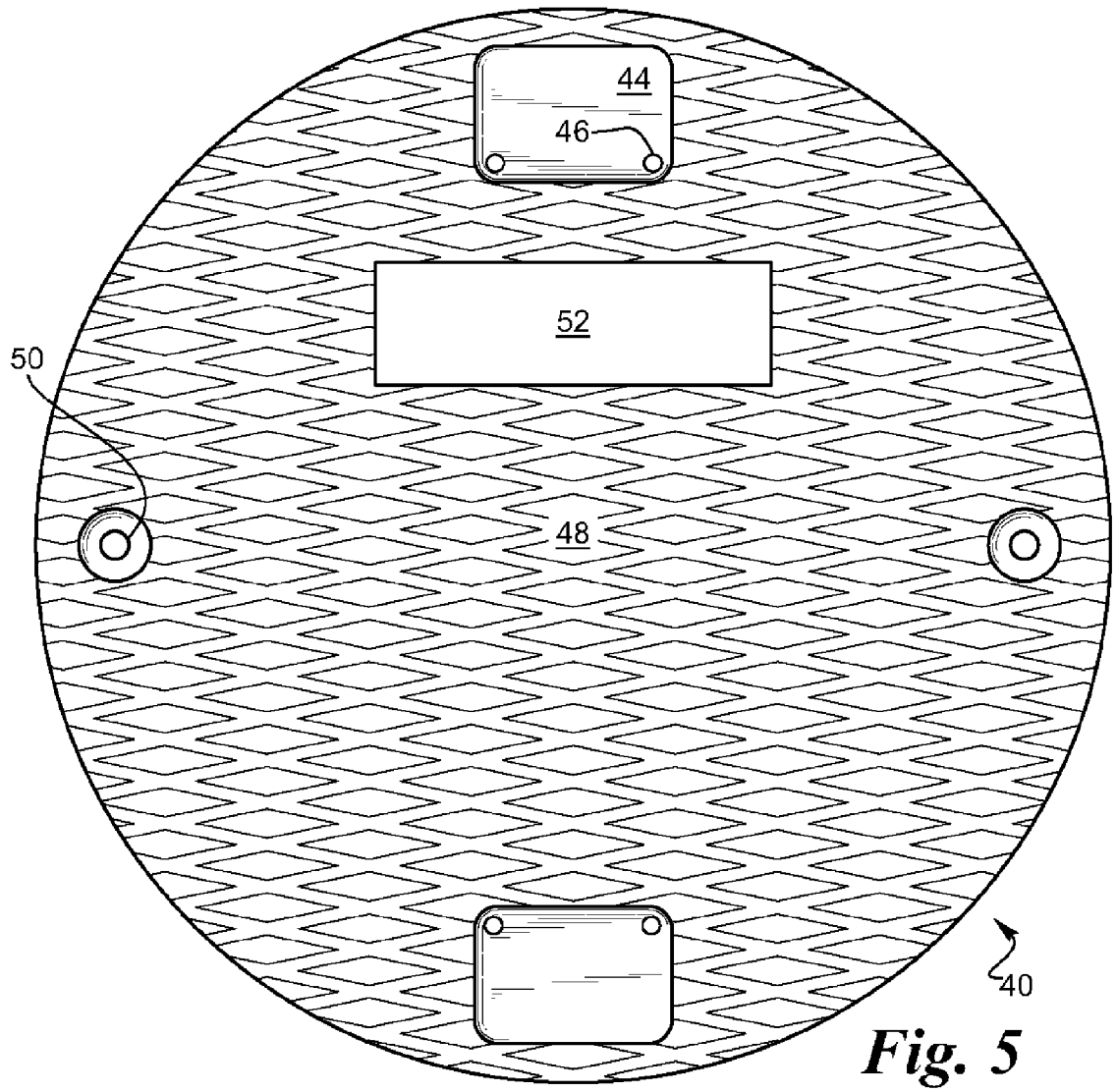

ELECTRIC HANDHOLE/PULLBOX ACCESS COVER

BACKGROUND OF THE INVENTION

1. Field of the Invention

This invention relates to electric handholes and pullboxes and more particularly to access covers therefore.

2. Description of the Related Art

Generally electric handholes and pullboxes are used on or adjacent to highways or sidewalks and are subject to being rolled over by vehicles, therefore the access covers for the handholes and pullboxes have to withstand large weights without cracking or breaking. Further covers made of metal are heavy and are subject to rust. Metal access covers, when placed on metal frame resting on top of the top of the handhole or pullbox, tend to freeze together such that the access cover cannot be easily removed. Further, because of the weight, it is difficult for workers to remove the access cover.

Metal access covers have other drawbacks such as cracking or breaking when struck by snowplows or when run over by heavy vehicles. A metal cover may bend and be permanently deformed when a heavy vehicle is on it.

It is desired to have an access cover which will withstand heavy weights without cracking, breaking or deforming and will remain flat on the top surface when the weight is removed.

It is also desired that the access covers will not rust, will not freeze to the frame and are light enough to be worked with easily and without injury to workers.

It is also desirable for access covers to be locatable by metal detectors or GPS means such that highway crews can locate the pullboxes and handholes for maintenance or repairs.

SUMMARY OF THE INVENTION

The access cover for the electric handhole or pullbox cover is made out of a plastic material which will not rust. The plastic is lightweight and easy to maneuver without causing injury to workers. The plastic material is not subject to becoming frozen to the frame when water is present.

The structure of the access cover provides strength such that a heavy load on the cover will deform the access cover but the access cover will return to its previous shape when the load is removed. The top of the access cover therefore remains flat in relation to the frame.

The access cover material being plastic will not crack, break, deform or rust. The access cover can have recesses for handles such that the access cover is easily removed from the frame for maintenance or repairs.

The access cover can have holes for allowing water to pass though the access cover for drainage.

The access cover can have a metal plate or a GPS device attached to help locate the handhole or pullbox by highway crews.

The handhole or pullbox can have a base with a narrow ledge which aids in setting the handhole or pullbox at the desired depth when installed and allows water to drain therefrom. The open bottom is also useful if the water table becomes high as the handhole or pullbox will not be pushed up by the water.

An adjustment collar can be used on the handhole or pullbox to adjust the height of the cover frame and cover.

The access cover has a plurality of strengthening chambers or cavities enabling the cover to support large weights while being made of a light weight plastic material.

OBJECTS OF THE INVENTION

It is an object of the invention to provide a lightweight plastic cover for an electric handhole or pullbox.

It is an object of the invention to provide an access cover which can support a large weight without cracking, breaking or deforming.

It is an object of the invention to provide an access cover which will not rust or corrode.

It is an object of the invention to provide an access cover which will bend under a large weight and return to a flat surface when the weight is removed.

It is an object of the invention to provide an access cover which will not freeze to the frame.

It is an object of the invention to provide an access cover with handles in a recessed handle well for ease of removing and replacing the cover on the electric handhole or pullbox.

It is an object of the invention to provide a drain for water entering the handle well.

It is an object of the invention to provide a ledge on the base of the electric handhole or pullbox for ease of setting the height of the electric handhole or pullbox in the ground and for providing an open base for water to enter or leave the electric handhole or pullbox.

It is an object of the invention to provide a ledge on the base of the electric handhole or pullbox for depth stability.

It is an object of the invention to provide a lightweight access cover for ease of working with the cover and reducing injuries of workers.

Other objects, advantages and novel features of the present invention will become apparent from the following description of the preferred embodiments when considered in conjunction with the accompanying drawings.

BRIEF DESCRIPTION OF THE DRAWINGS

FIG. 4 is a side cross section of the access cover.

FIG. 5 is a top view of the access cover.

DESCRIPTION OF THE PREFERRED EMBODIMENTS

Figure 1:
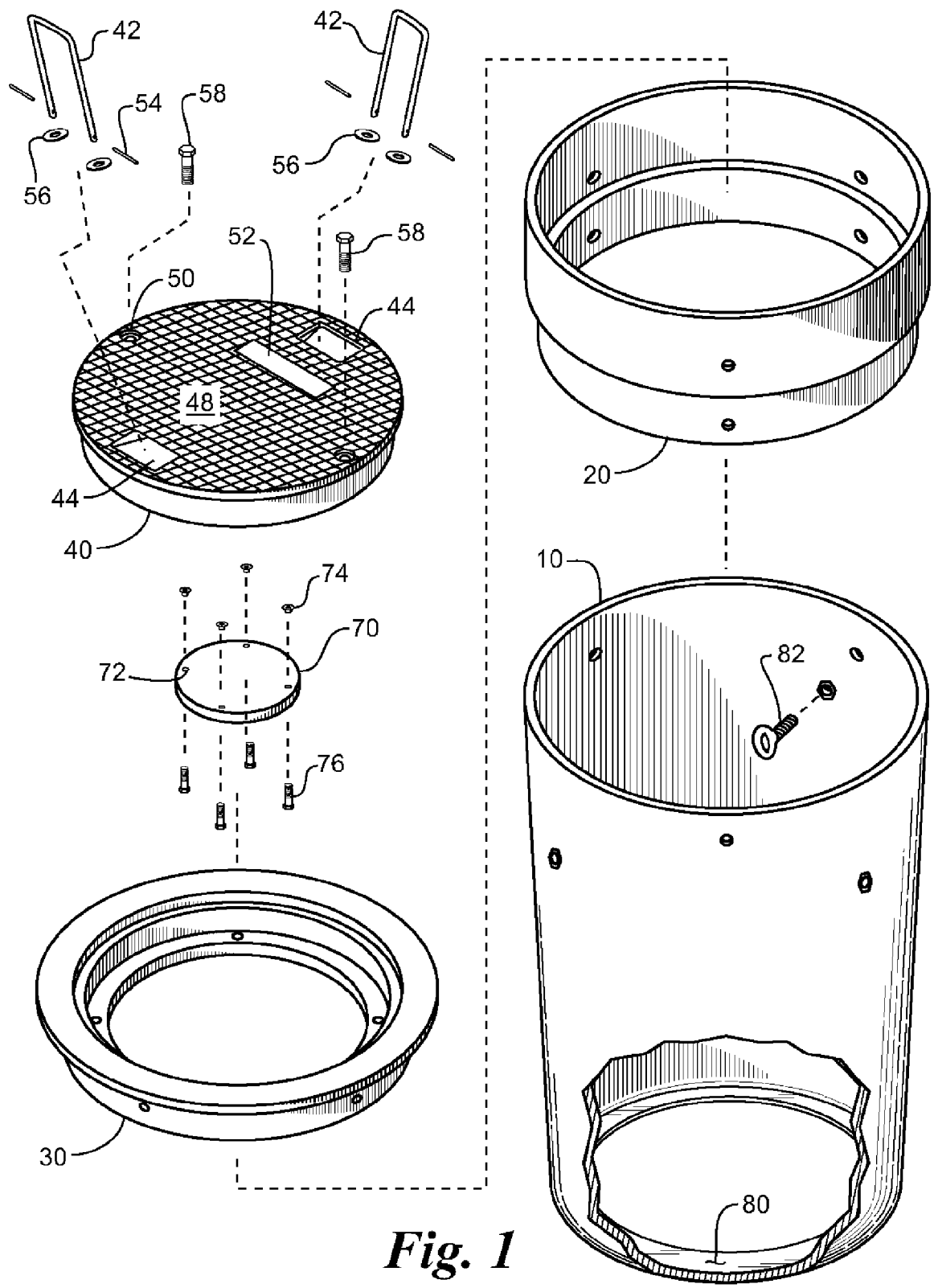
FIG. 1 is a perspective view of the unassembled parts of the access cover and the electric handhole or pullbox.
Figure 2:
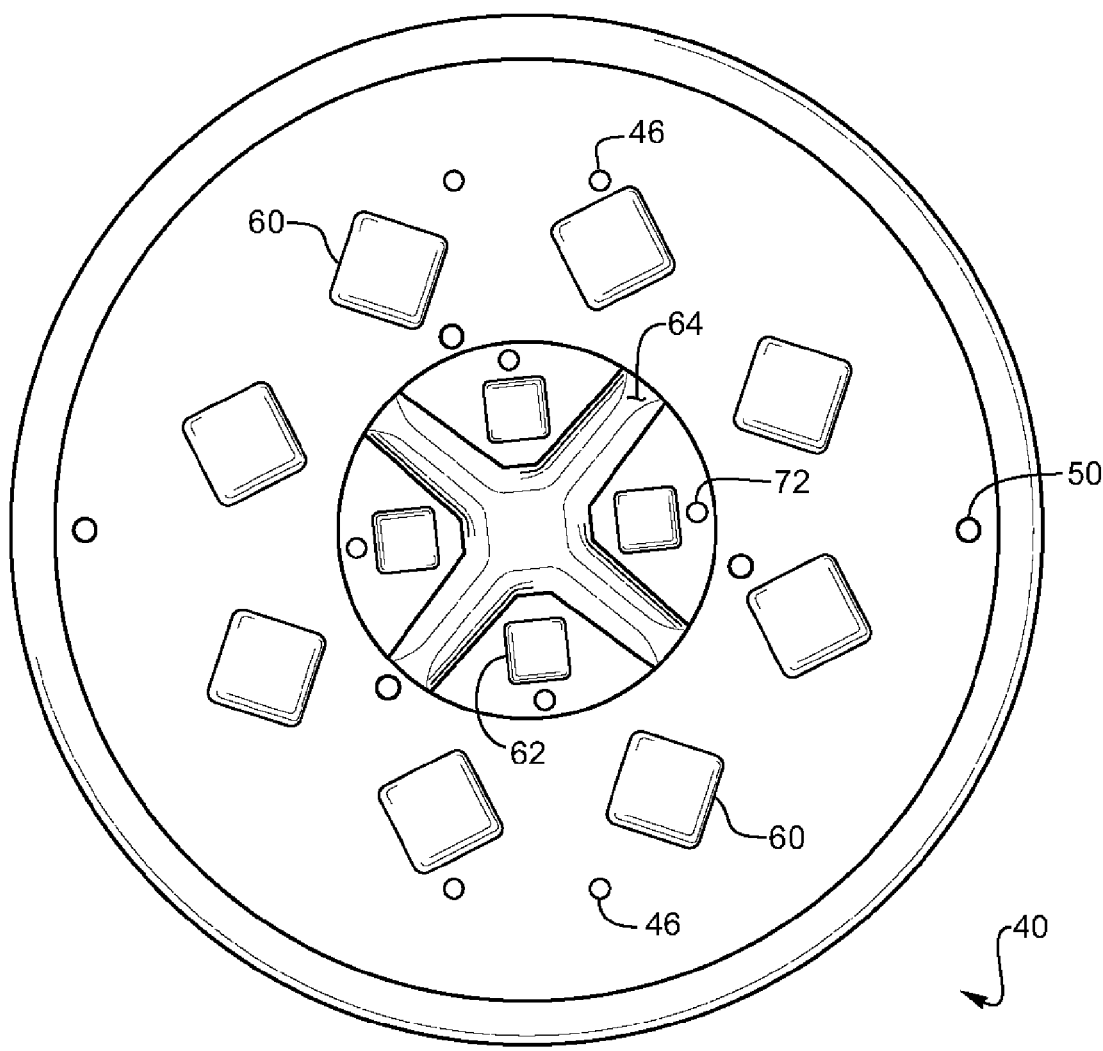
FIG. 2 is a bottom view of the access cover.
Figure 3:
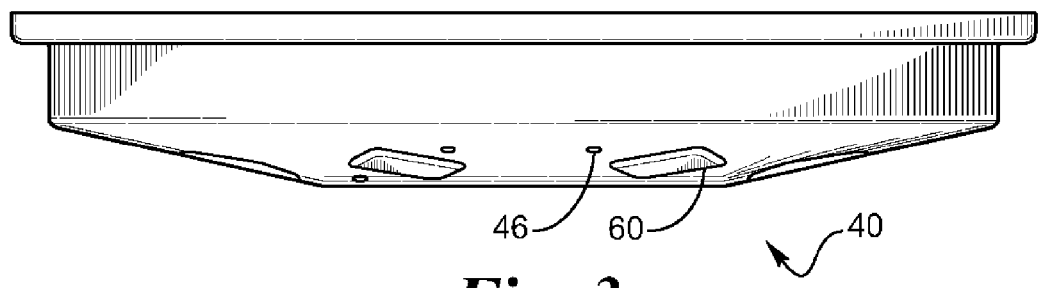
FIG. 3 is a side view of the access cover.

Every electric handhole or pullbox used on highways has to have an access cover for allowing access to the wiring inside. FIG. 1 shows an expanded view of the cover and the electric handhole or pullbox. The access cover 40 has handles 42 which are preferably made of stainless steel so they will not rust or corrode. The handles 42 have a pin 54 which prevents a washer 56 from being removed from the arms of handles 42. The washer 56 in turn prevents the handles 42 from being removed from the aperture 46 in access cover 40. The arms of handles 42 slide up and down relative to the access cover 40 to be in the stored down position until needed and then can be raised up when in use. The access cover 40 has recessed handle wells 44 which have a sloped access area for easy access to the handles 42. The apertures 46 are large enough to allow the handles to easily slide up and down therein and to allow water to drain from the handle wells 44.

The access cover 40 is constructed with vertical channels 60 spaced in a circle at approximately half the radius of the cover. Channels 60 have walls which extend from the bottom to the top of the access cover 40. In the embodiment shown, the channels are square; however, any shape may be used. The squares may be on the order of 5 centimeters per side and can vary depending on the design of the access cover 40. The channels give the access cover strength while allowing the cover to bend concavely when large weights are placed thereon. The plastic material will bend when a large weight is placed thereon without breaking, cracking or deforming and resiliently return to a flat original configuration on the top when the weight is removed. Similarly, an inner ring of vertical channels 62 nearer the center of the access cover 40 provides strength for the center of the cover. The vertical channels 62 may also be of any shape and size. As shown, the vertical channels 62 are square with sides which are shorter than the vertical channels 60. The access cover 40 also has reinforcing radial channels 64 running from the center radially outward from the center for strengthening the central part of the cover and preventing the center portion from bending. The radial channels 64 extend from the center approximately to the circumference of base plate 70. Base plate 70 is preferably made of a metal which can be detected using a metal detector for finding the access cover 40 in case the cover is buried under soil, snow or ice. Alternatively, a GPS device may be used in the access cover 40, such as on base plate 70, to help locate the electric handhole or pullbox by finding the access cover 40. Base plate 70 may be attached to the access cover 40 by bolts 76 in bolt holes 72 having threaded inserts 74. The base plate 70 installed helps to increase the load carrying capacity of the access cover 40 and prevent the middle portion from collapsing when a weight is placed on top of the cover.

Access cover 40 is preferably made of a plastic such as polyethylene which is lightweight and easy to lift compared to iron covers. With the handles 42 installed the access cover 40 is easy to lift off the frame without workers having to strain and perhaps injure themselves.

The frame 30 can be placed directly on top of an electric handhole or pullbox 10 or on an extension 20 inserted between the electric handhole or pullbox 10. The extension 20 can be used to adjust the height of the cover. The frame 30 may be bolted to the handhole or pullbox 10 or rest on the top. Bolts 58 can be used to insert in bolt holes 50 to secure the access cover 40 to frame 30.

The electric handhole or pullbox 10 may have a open base with a ledge 80 on the circumference. The ledge 80 allows the electric handhole or pullbox 10 to rest on the ground so that it is stable at the base. The open area at the bottom allows water to enter and leave the electric handhole or pullbox 10. On installation, if the excavated hole is too deep, material such as sand or gravel can be added to the hole and the electric handhole or pullbox 10 can placed in the hole and tapped down into place with the ledge 80 allowing the material to be displaced around it until the electric handhole or pullbox 10 is stably placed at the right height.

The electric handhole or pullbox 10 may have any number of eyebolts 82 inside for holding wires and wire harnesses.

The top of the access cover 40 preferably has diamond ridges 48 covering the top to aid in providing a non-slip surface. The top of the cover also has an area for a name plate 52 such that the cover can be identified and the contents of the electrical handhole or pullbox are known.

Obviously, many modifications and variations of the present invention are possible in light of the above teachings. It is therefore to be understood that, within the scope of the appended claims, the invention may be practiced otherwise than as specifically described.

What is claimed is:

1. An access cover for an electric handhole or pullbox comprising,
    a cover having a flat top portion,
    a circumferential wall perpendicular to the top portion,
    a bottom wall portion extending inward from the circumferential wall,
    a plurality of vertical channels between the top and bottom walls on the circumference of a circle with a radius approximately halfway from the center of the cover to the circumferential wall and a second plurality of vertical channels at a second radius of lesser length than the radius to give the cover strength when a load is placed on the top while allowing the top to bend concavely under the load.

2. An access cover for an electric handhole or pullbox as in claim 1 having,
    at least one horizontal channel between the top and bottom of the cover passing though the center of the cover.

3. An access cover for an electric handhole or pullbox as in claim 2 having,
    a recessed well in the top cover near the circumference,
    a handle extendably attached within the recessed well in the top cover.

4. An access cover for an electric handhole or pullbox as in claim 2 having,
    a bottom plate attached at the center of the bottom of the cover.

5. An access cover for an electric handhole or pullbox as in claim 2 having,
    a diamond grid pattern on the flat top portion of the cover.

6. An access cover for an electric handhole or pullbox as in claim 2 having,
    an identification plate on the flat top portion of the cover.

7. An access cover for an electric handhole or pullbox as in claim 3 having,
    a bottom plate attached at the center of the bottom of the cover.

8. An access cover for an electric handhole or pullbox as in claim 3 having,
    a diamond grid pattern on the flat top portion of the cover.

9. An access cover for an electric handhole or pullbox as in claim 3 having,
    an identification plate on the flat top portion of the cover.

10. An access cover for an electric handhole or pullbox as in claim 7 having,
    a diamond grid pattern on the flat top portion of the cover.

11. An access cover for an electric handhole or pullbox as in claim 7 having,
    an identification plate on the flat top portion of the cover.

12. An access cover for an electric handhole or pullbox as in claim 10 having,
    an identification plate on the flat top portion of the cover.

13. An access cover for an electric handhole or pullbox as in claim 2 having,
    a cylindrical pullbox having an open base with a ledge for placing the access cover thereon.

14. An access cover for an electric handhole or pullbox as in claim 1 having,
    at least one horizontal channel between the top and bottom of the cover passing though the center of the cover and extending to approximately the second radius.

15. An access cover for an electric handhole or pullbox as in claim 1 having,
   a recessed well in the top cover near the circumference,
   a handle extendably attached within the recessed well in the top cover.

16. An access cover for an electric handhole or pullbox as in claim 1 having,
   a bottom plate attached at the center of the bottom of the cover.

17. An access cover for an electric handhole or pullbox as in claim 1 having,
   a diamond grid pattern on the flat top portion of the cover.

18. An access cover for an electric handhole or pullbox as in claim 1 having,
   an identification plate on the flat top portion of the cover.

19. An access cover for an electric handhole or pullbox as in claim 1 having,
   a cylindrical pullbox having an open base with a ledge for placing the access cover thereon.

* * * * *